Sept. 5, 1939.  T. A. LARRY ET AL  2,171,577
METHOD OF ATTACHING A FITTING TO A PIPE LINE
Original Filed Sept. 14, 1936  5 Sheets-Sheet 5

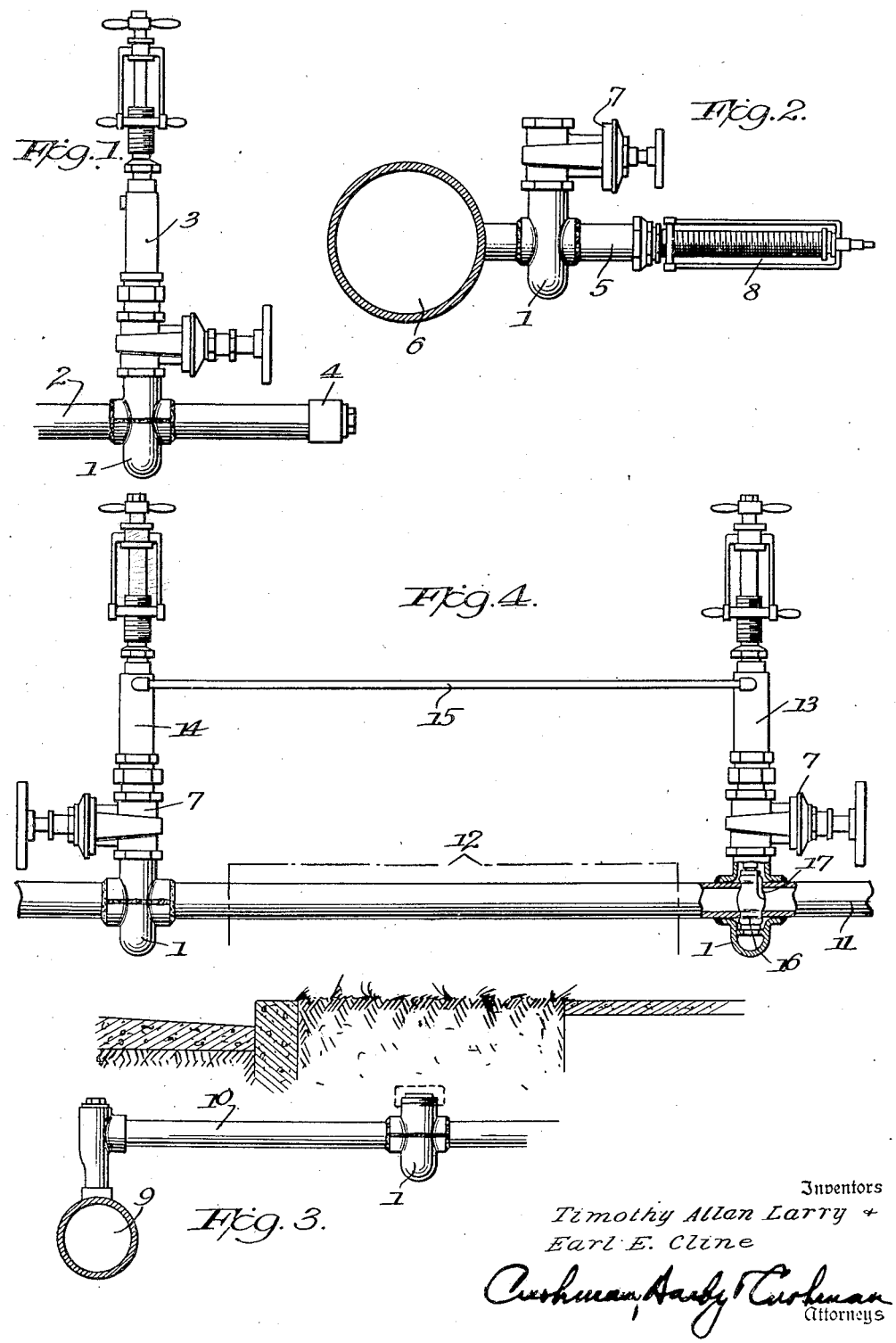

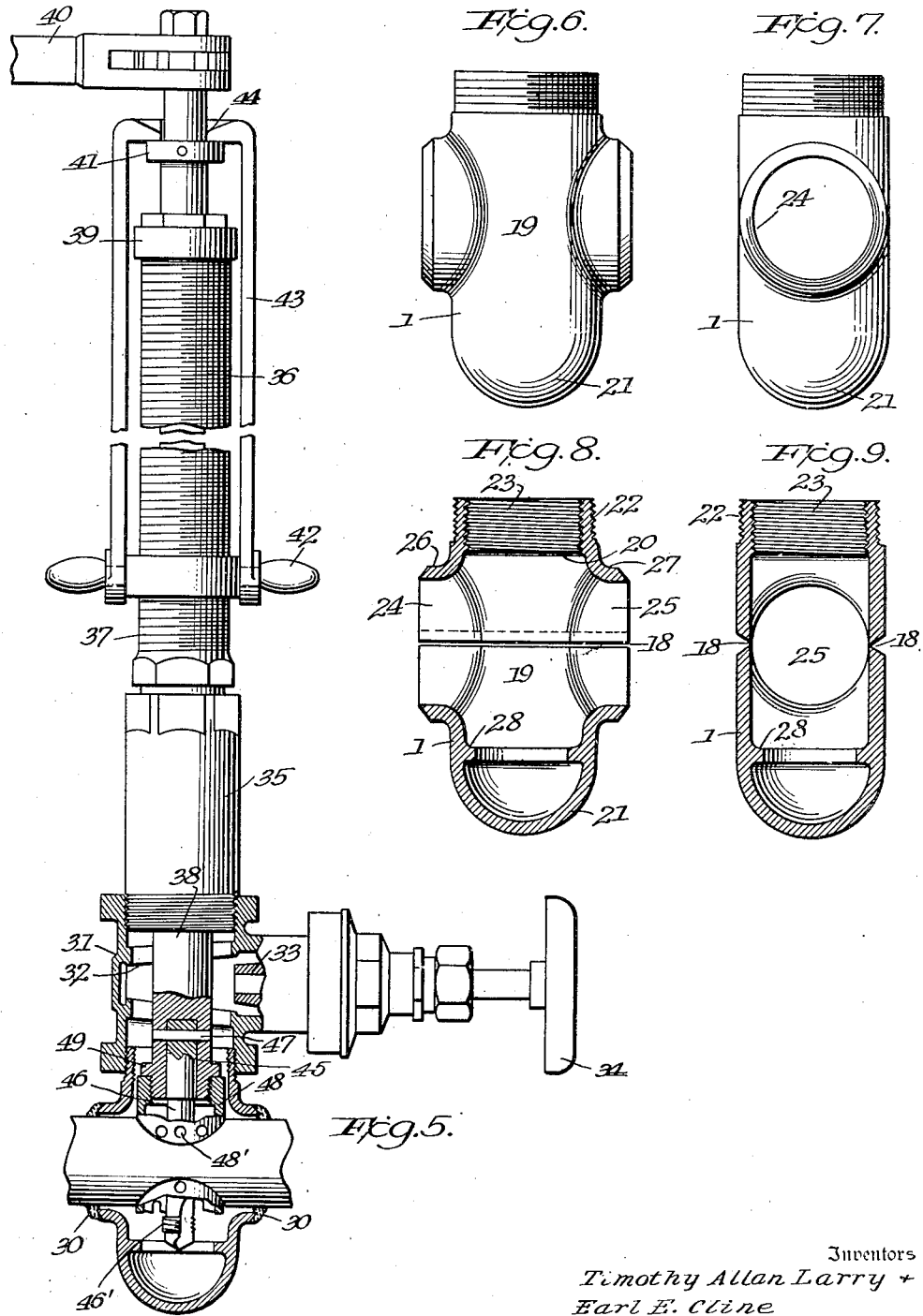

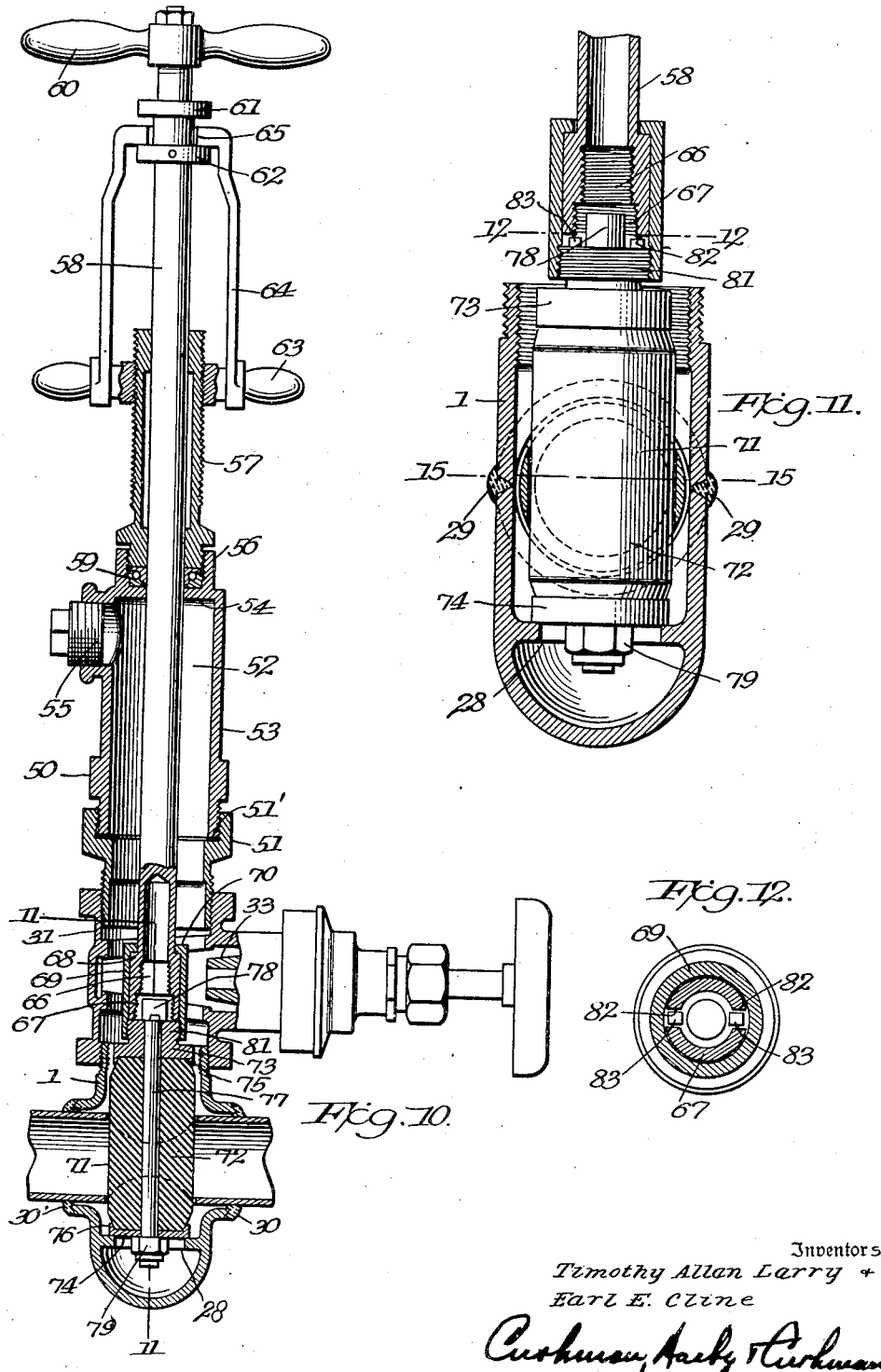

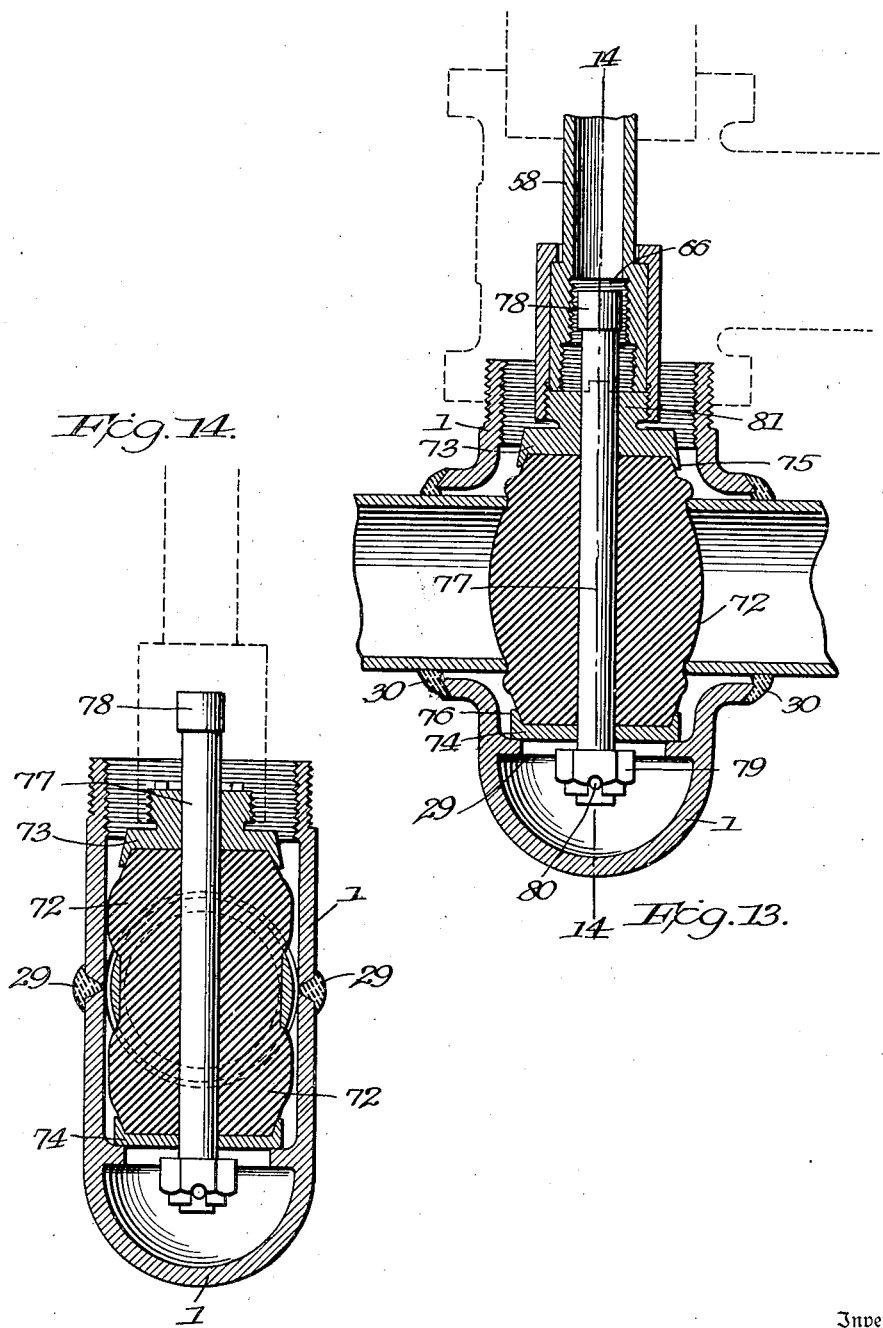

Inventors
Timothy Allan Larry &
Earl E. Cline

Cushman, Darby & Cushman
Attorneys

Patented Sept. 5, 1939

2,171,577

UNITED STATES PATENT OFFICE 2,171,577

METHOD OF ATTACHING A FITTING TO A PIPE LINE

Timothy A. Larry and Earl E. Cline, Decatur, Ill.; said Cline assignor to Mueller Co., Decatur, Ill., a corporation of Illinois Original application September 14, 1936, Serial No. 100,782. Divided and this application January 25, 1937, Serial No. 122,249

2 Claims. (Cl. 29—157)

This invention relates to and has for its object the provision of methods for attaching a fitting to a pipe or pipe line in a convenient, expeditious, and economical manner.

A particular object of the invention is to overcome the difficulties heretofore encountered in the repair and extension of pipe lines containing gas, oil or other fluids. It will be understood that such pipe lines are customarily repaired or extended without removing them from their location beneath the surface of the ground and preferably without loss of fluid.

Other objects of the invention will be apparent from the accompanying drawings and description.

This application is a division of copending application Serial No. 100,782, filed September 14, 1936.

Referring to the drawings:

Figure 1 illustrates the use of the fitting with a shut-off apparatus where a pipe line extension is to be made.

Figure 2 illustrates the use of the fitting where a pipe is to be connected to a main line.

Figure 3 illustrates the use of the fitting as a substitute for the usual corporation cock in a service pipe.

Figure 4 illustrates the use of the fitting in combination with by-passing apparatus for by-passing fluid around a section of a pipe line.

Figure 5 is a view, partly in section, of the apparatus which is used to establish an opening in a pipe and within a fitting attached to the pipe.

Figure 6 is a side view of one form of the fitting, as it is customarily manufactured and sold, and before it is cut into two parts and attached to the pipe.

Figure 7 is an end view of the fitting shown in Figure 6.

Figure 8 is a longitudinal sectional view of the fitting of Figure 6, after it has been cut into two parts.

Figure 9 is a transverse sectional view of the fitting of Figure 6, after it has been cut into two parts.

Figure 10 is a view, partly in section, of the fitting applied to a pipe and a shut-off apparatus associated with the fitting.

Figure 11 is a transverse view, partly in section, taken on the line 11—11 of Figure 10.

Figure 12 is a horizontal section taken on the line 12—12 of Figure 11.

Figure 13 is a detail sectional view of the fitting and shut-off apparatus shown in Figure 10, illustrating the relative positions generally assumed by the parts when the shut-off member is longitudinally compressed and distorted.

Figure 14 is a transverse sectional view taken on the line 14—14 of Figure 13.

Figure 15:
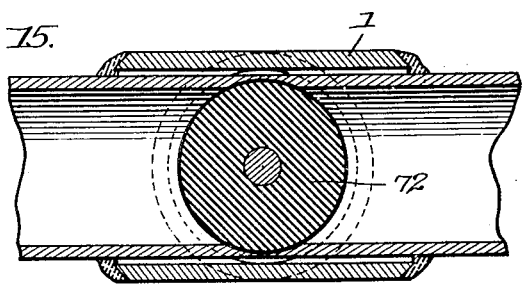
Figure 15 is a horizontal section taken on the line 15—15 of Figure 11.

Referring more particularly to the drawings, Figure 1 illustrates one of the uses of the fitting of this invention, the fitting 1 being applied to a pipe 2 and having a shut-off apparatus 3 secured thereto at its upper end. The shut-off apparatus 3, as will be more fully hereinafter explained, includes a shut-off member which may be projected into an opening which has previously been established in the pipe and within the fitting for the purpose of shutting off the flow of fluid at the point of attachment of the fitting. This operation may be carried out without substantial loss of fluid or fluid pressure and an extension may be secured to the dead end 4 of the pipe 2 without interrupting service to consumers whose service lines communicate with the pipe 2.

Another use of the fitting 1 is shown in Figure 2, where a branch pipe 5 is to be connected to a main pipe 6 without substantial loss of fluid or fluid pressure. The branch pipe 5 is inserted through the lateral openings of the fitting 1, which, in this case, need not be cut into two parts and one end of the branch pipe 5 is welded to the side of the main 6. A gate valve 7 and an enclosed drilling apparatus such as will be hereinafter described are connected to the open end of fitting 1 for the purpose of drilling an opening in the pipe 5 and within the fitting 1. After the opening is drilled, a shut-off apparatus, such as shown at 3 in Figure 1, is attached to the upper end of the valve 7 in place of the drilling apparatus. An enclosed drilling apparatus 8 may now be attached to the outer end of the branch pipe 5 and the drill may be projected through the branch pipe 5 to establish an opening in the main 6 and within the branch pipe. After the drill, associated with the drilling apparatus 8, is withdrawn, the shut-off apparatus, cooperating with the fitting 1, may be used to prevent flow of fluid through the branch pipe 5 and the drill 8 may then be removed without substantial loss of fluid or fluid pressure, and any desired pipe or pipe line system attached to the outer end of the branch pipe 5.

Figure 3 is a diagrammatic illustration showing a main pipe 9 and a service pipe 10 connected thereto. In the usual municipal gas distributing system, the main pipe is located under the street paving and each service pipe, of which there are a large number, communicates with a residence or other building. In order that the flow of gas may be shut off in any service pipe when repairs are to be made within a building, it is customary to provide a corporation cock in each service pipe. As will be apparent the installation of a very large number of corporation cocks, relatively few of which are ever used, is very expensive and the present invention provides an inexpensive fitting which may be applied to each service pipe in lieu of a corporation cock. When it is desired to shut off the flow of gas through the service pipe, an opening may be established in the service pipe and within the fitting and a shut-off apparatus, shown at 3 in Figure 1, and more fully described hereinafter, is applied to the upper end of the fitting. When it is desired to restore flow through the service pipe, a closure may be inserted in the open end of the fitting and the shut-off apparatus removed without substantial loss of fluid or fluid pressure.

Figure 4 illustrates the use of the fittings of this invention in combination with by-passing apparatus where it is desired to by-pass the flow of fluid around a section of a pipe line which is to be removed, repaired or otherwise operated upon. The pipe line is designated at 11 and fittings 1, 1 are attached to the pipe line 11 at either side of the section 12 which is to be operated upon. Gate valves 7, 7 are secured to the open end of each fitting and an enclosed drilling apparatus secured to the upper end of each gate valve whereby an opening may be established in the pipe and within the fitting, as will be more fully described in connection with Figure 5. After the openings have been established and the drills withdrawn the gate valves 7 are operated to closed position, wherepon the drilling apparatus are replaced by by-passing apparatus 13 and 14. The by-passing apparatus 13 and 14 which include apertured housings connected by a by-pass line 15, differ from the shut-off apparatus shown at 3 in Figure 1 and to be described more particularly in connection with Figure 10, in that the resilient member 16, which is inserted in the pipe, after the gate valves have been opened, is provided with a cut-away portion at 17. By adjusting these members 16 so that the respective cut-away portions 17 face away from the section 12, fluid will be permitted to flow from the upper or pressure side of the line up through the cut-away portion 17 and the by-passing apparatus 13, through the by-pass line 15, down through the by-passing apparatus 14, and thence into the lower section of the pipe line. By applying pressure to the respective upper ends of the members 16, they may be longitudinally compressed and laterally expanded into sealing engagement with the adjacent pipe wall whereby flow of fluid into the section 12 of the pipe line will be prevented. It will be apparent that by establishing a flow circuit through the by-pass line 15 before the section 12 is shut off, there will be no interruption in the flow through the remainder of the pipe line 11. Moreover, as will appear in the following description, the apparatus may be attached and removed, and closures may be inserted in or removed from the upper ends of the fittings 1 without substantial loss of fluid or fluid pressure.

The fitting 1 is preferably formed as an integral casting, as shown in Figures 6 and 7, although it may be formed otherwise, and in the usual installation it is thereafter divided into two parts, as shown in Figures 8 and 9, by cutting along the two sides at 18. The fitting consists of a substantially cylindrical or tubular body 19, having an opening 20 at its upper end and closed at its lower end 21. The upper end, as shown in Figures 8 and 9, is preferably threaded exteriorly at 22, for the attachment of the gate valve 7, or other apparatus, and the upper end is preferably also threaded interiorly as at 23, so that a threaded closure may be inserted, as will be hereinafter described.

The fitting is provided with aligned lateral openings 24, 25, which are adapted to receive a pipe, and the openings are bounded by the laterally extending hubs or flanges 26 and 27. The lower cylindrical portion is provided interiorly with a circumferential ledge or projection 28, which is adapted to serve as an abutment to limit the inward or downward movement of the shut-off member which, as will be described, is inserted through the open end of the fitting.

The fittings may be made of a high grade cast steel, of a composition similar to steel pipe, thereby insuring weldability, and are manufactured in various sizes for use with pipes of various diameters.

The attachment of the fitting to a pipe is preferably accomplished in the following manner. A fitting is selected, the lateral openings 24, 25 and hubs 26, 27 of which, preferably have an internal diameter appreciably or slightly larger than the external diameter of the pipe to which it is to be attached, for example, in actual practice a difference of approximately one-eighth of an inch has been found suitable. After the fitting is cut transversely and separated into two parts as shown in Figures 8 and 9, the upper and lower parts are brought together around the pipe and welded to each other by transverse welds 29, 29, and the fitting is then welded to the pipe by the end welds 30, 30.

It will be understood that in its final or attached positions the fitting is preferably in upright position, that is, with its cylindrical body portion 19 disposed vertically and its open end 20 up, in order that the apparatus which is connected to the open end will be upright, although, of course, installation of the apparatus and practice of the method involved is not dependent on such position.

It will be understood that the pipe line is usually buried several feet below the surface of the ground, that an excavation must be made to obtain access to the pipe, and that usually, therefore, the welding must be done within the excavation.

In order that the welding may be accomplished in an expeditious manner, the two parts of the fitting are brought together around the pipe which passes through the lateral openings 24, 25, and held with the fitting in horizontal position, so that one side joint 18 will be uppermost and readily accessible for welding from above. The side joint which is uppermost is welded, at 29, and the fitting is then rotated about the pipe through approximately 180° or until the other side is uppermost, whereupon the second joint may be conveniently welded from above. Both sides having been thus welded, the fitting is turned to upright position and rigidly secured to the pipe by welding along the edges of the laterally extending hubs 26 and 27.

By reason of the fact that the internal diameter of the lateral openings 24 and 25 and the hubs 26 and 27 is, as stated above, preferably greater than the external diameter of the pipe, the fitting may be, and preferably is, so maintained with respect to the pipe that during the above described welding operations the fitting does not contact the pipe. Maintaining the sides of the fitting out of contact with the pipe, while they are being welded, will assist in preventing an undesirable transfer of heat to the pipe, and will also insure against any attachment of the fitting to the pipe, along the side joints, which would prevent rotation of the fitting. Furthermore, the provision of a space between the hubs 26, 27, and the pipe insures a stronger connection at the welds 30, 30 than would be possible if the hubs contacted the pipe, the increased strength being due in part to the tendency of the molten welding metal to flow inwardly, between the hubs and the pipe, for a short distance, thus directly uniting a greater area of the pipe and hubs.

The construction, and method of attaching the fitting above described, not only enables the fitting to be manufactured and applied with great economy, but another problem, which heretofore presented serious difficulties in the use of tubular fittings, has been overcome. Reference is made to the fact that difficulty has been experienced in the use of the fitting disclosed in Patent No. 2,108,068, for Pressure control fitting, issued to Timothy Allan Larry, on February 15, 1938, due to breaking of the shell cutters which are inserted through the upper open end of the cylindrical portion of the fitting for the purpose of drilling through the pipe within the fitting. It has been found that this is caused by carbonization and hardening of the portions of the pipe, which are within and adjacent the walls of the vertical cylindrical portion of the fitting, due to the heat used in welding the joint between the fitting and the pipe. It will be understood that, while this hardening of the metal occurred principally at the outer margin of the area of the pipe wall defined by the cylindrical portion of the fitting, the diameter of the shell cutters which are used is preferably nearly as great as the internal diameter of the cylindrical portion of the fitting, in order that substantially the entire cross section of the pipe may be cut out, and therefore the use of small shell cutters, which would cut between the zones of hardened metal, is not feasible.

The problem thus presented is solved by the present construction and method in that the fitting is welded to the pipe at a substantial distance from the portion of the pipe which is to be cut, and the zones of carbonized and hardened metal, which result from the application of the welding tool to the pipe, do not extend to the area defined by the wall of the cylindrical portion 19 of the fitting. The desirable spacing of the welds from the area, which is to be cut, is made possible in the present embodiment of the invention by the provision of the laterally extending hub portions 26 and 27. Furthermore the conduction of heat, from the points of application of the welding heat to the area within the cylindrical portion 19 of the fitting, is diminished by reason of the fact that the fitting is spaced from the pipe at all points and therefore does not act as an additional conductor of heat to the said area, as it would if it were in contact with the pipe.

A further advantage of the radially extending hubs 26, 27 resides in the added strength that they give to the assembly, which may include various pieces of apparatus connected, directly or indirectly to the upper open end of the fitting. Such apparatus is necessarily subjected to stresses, including torques, and the hub portions greatly increase the rigidity of the structure.

It will be understood that in some instances, as for example where the fitting is to be attached to a relatively short pipe, such as the pipe 5 shown in Figure 2, the pipe may be preliminarily inserted through the lateral openings of the fitting 1 and it will be unnecessary to cut the fitting into two parts. In such instances, the above described method of attachment may be modified in an obvious manner, since no side welds are necessary. The internal diameter of the lateral openings and hubs are nevertheless preferably appreciably greater than the external diameter of the pipe in order to obtain a stronger union between the fitting and the pipe and to reduce conduction of heat from the end walls interiorly of the fitting, as above described.

After a fitting has been welded to a pipe, a valve body 31 having a tapered valve seat 32 and provided with a valve, preferably a gate valve 33, operable by a handle 34, as shown in Figure 5, is threaded on the upper end of the fitting. An opening may now be established in the pipe and within the fitting, without substantial loss of fluid or fluid pressure by means of the method and apparatus now to be described.

An adapter sleeve 35 is threaded into the upper end of the valve body 31, as shown in Figure 5, and a device or machine 36, generally similar to pipe drilling machines of well known construction and including a feed sleeve 37, is positioned upon the adapter sleeve 35 by means of screw threaded engagement between the feed sleeve 37 and the upper end of the adapter sleeve 35. A bar 38 is slidably and rotatably mounted within the feed sleeve 37, a fluid tight joint being maintained between the two by means of conventional packing (not shown) secured upon the upper end of the feed sleeve 37 by an internally flanged collar 39. The bar 38 is provided at its upper end with an operating handle 40 having a conventional ratchet device thereon to permit the bar 38 to be rotated with a ratchet effect. A collar 41 is fixed on the upper portion of the bar 38 beneath the handle 40 and, in order that the bar 38 may be fed downwardly in the usual manner, a feed screw 42 is threaded upon the feed sleeve 37 and may be connected to the bar 38 by means of a yoke 43 pivoted upon the feed screw and having its head portion slotted as at 44 so that it may be moved into engagement with the upper surface of the collar 41 as shown in Figure 5.

The lower end of the bar 38 is provided with a central bore 45 for the reception of a pilot drill 46, which is retained therein by means of a pin 47 passing through suitable apertures in the bar and pilot drill. The lower end of the pilot drill is enlarged to provide a shoulder 46' thereon.

The lower end of the bar 38 is externally threaded for engagement with the internal threads of a shell cutter 46, and is provided with a flange 49, positioned above the screw threads, against which the upper end of the shell cutter abuts when the latter is tightly screwed onto the bar. The wall of the shell cutter is apertured as indicated at 46' in order that the flow of fluid through the pipe 1 will not be interrupted during the cutting operation.

In order to drill through the pipe 1, within the fitting 17 the bar 38 is moved downwardly, with the gate valve 33 open, until the pilot drill 46 engages the pipe. The yoke 43 is then swung into engagement with the bar 38, its slotted head portion positioned above the collar 41 of the bar, and the drilling accomplished by rotating the bar 38 by means of handle 40 and applying downward pressure by rotating the feed screw 42 to the right.

The diameter of the shell cutter 46 is preferably slightly greater than the internal diameter of the pipe 1, in order that substantially the entire cross-section of the pipe will be removed, as shown in Figures 5 and 14.

It will be understood that the pilot drill precedes the shell cutter through the pipe and acts as a guide for the shell cutter. The coupons, which are cut out of the pipe by the shell cutter, will be caught on the shoulder 46' as the lower end of the pilot drill is withdrawn.

Owing to the fact that the drilling device is completely enclosed, no fluid will escape during the drilling operation.

When the drilling is completed the yoke 43 is disengaged from the bar 38 and the latter is then raised to withdraw the shell cutter and pilot drill into the adapter 35. The gate valve 33 is now operated to closed position and the drilling apparatus 36 is removed by unscrewing the adapter 35 from the valve body 31.

Where a shut-off apparatus is to be attached to the fitting, as in the examples illustrated in Figures 1, 2 and 3, and where it is desired to shut off the flow of fluid through the pipe to which the fitting has been attached, the method and apparatus now to be described is employed.

Referring to Figure 10, the shut-off apparatus, generally designated at 50, includes an adapter 51 externally screw threaded at its lower end for attachment to the upper end of the valve body 31. The adapter, which may be made in various sizes, is preferably provided at its upper end with internal screw threads for the attachment of a chamber or housing 52.

The chamber 52 is preferably substantially cylindrical and its lower end, which is open, is externally screw threaded for engagement with the internal screw threads at the upper end of the adapter 51. An annular gasket 51' is inserted between the chamber or housing 52 and the adapter to provide a fluid tight joint. The chamber 52 comprises the substantially cylindrical side wall 53 and a centrally apertured top wall 54. The side wall 53 is provided with an internally threaded opening 55 for the connection of a by-pass line as shown in Figure 5, but where the apparatus is to be used only for shutting off the flow of fluid through a pipe line to a pipe, the opening 55 may be sealed by the insertion of a conventional plug. The side wall of the by-passing chamber extends above the top wall 54 and the extension 56 is provided with internal threads for the attachment of a feed sleeve 57.

A bar 58 is slidably and rotatably mounted within the feed sleeve 57 and within the centrally apertured top wall 54 of the chamber or housing 52, a tight joint being maintained around the lower end of the feed sleeve, by means of a conventional packing 59 located between the feed sleeve 57 and the upper wall 54 of the chamber 52.

The bar 58 is provided at its upper end with an operating handle 60. Spaced collars 61 and 62 are fixed on the upper portion of the bar 58 and in order that the bar 58 may be forced upwardly or downwardly, a feed screw 63 is threaded on the feed sleeve 57 and may be connected with the bar 58 by means of a yoke 64 pivoted upon the feed screw 63 and having its head portion slotted as at 65 so that it may be swung into engagement with the bar 58 between the collars 61 and 62, as shown in Figure 9.

The lower end of the bar 58 is provided with a socket 66 provided with left-handed internal threads, and a lower counter-bored socket 67 internally threaded with right-handed threads. The lower end of the bar 58 is slightly enlarged to provide a shoulder 68 for the retention of a sleeve 69, the upper end of which is internally flanged at 70. The sleeve 69, which is adapted to be slipped on over the top of the bar 58, during the assembly thereof and before the handle 60 and collars 61 and 62 are attached, extends below the lower extremity of the bar 58 and is provided at its lower end with internal screw threads for the attachment of the shut-off means 71.

Referring to Figures 10 and 11, the shut-off means generally designated at 71, includes a substantially cylindrical member 72, made of some resilient material such as rubber. Disc-like caps 73 and 74, which are preferably inwardly flanged as shown at 75 and 76, are positioned above and below the member 72. The caps 73 and 74 and the member 72 are centrally apertured for the reception of a rod 77 on which they are slidably mounted. The rod 77 is provided at its upper end with a slightly enlarged head 78 and its lower end is threaded for the reception of a nut 79 whereby the member 72 may be clamped between the upper and lower caps 73 and 74 when the nut 79 is tightened. The nut 79 is preferably provided with slots on its under surface and the rod 77 is apertured at its lower end for the reception of the usual locking pin 80.

The cap 73 is provided with a central and upwardly extending cylindrical portion 81 which is externally threaded for attachment to the internally threaded sleeve 69.

When the cylindrical portion 81 of the cap 73 is threaded into the sleeve 69 it will abut the lower end of the bar 58 and it will therefore be apparent that downward pressure on the bar 58 will be directly transmitted to the cap 73. It will also be apparent that upward movement of the bar 58 will raise the cap 73 by reason of the fact that the internally flanged sleeve 69 engages the lower enlarged end of the bar 58 and also engages the upwardly extending central portion 81 of the cap 73.

The lower extremity of the bar 58, which forms the socket 67 is provided with slots 82, 82, adapted to receive lugs 83, 83, positioned on the upper surface of the cylindrical portion 81, as shown in Figure 12, whereby relative rotation of the cap 73, and consequently the member 72, with respect to the bar 58, will be prevented.

When the shut-off apparatus is attached to the upper end of the valve body 31, the shut-off member 72 will be withdrawn into a position within the chamber 52, this withdrawal being accomplished by disengaging the yoke 64 from the bar 58 and pulling up on the handle 60. After the shut-off apparatus 50 has been attached to the valve body and after all of the joints have been made tight, the valve 33 may be moved to open position.

The yoke 64 of the shut-off apparatus is now swung to upright position engaging the bar 58 between the collars 61 and 62, as shown in Figure 10, and the feed screw 63 is turned to the right to apply downward pressure, through the collar 62 and bars 58, to the cap 73.

The cap 74 at the lower end of the member 72 is held against downward movement by the abutments 28 of the fitting 1, and since the member 72 is made of resilient material, the downward pressure on the cap 73 will cause the member 72 to expand laterally as shown in Figures 13 and 14.

The caps 73 and 74 and the member 72 are slidable on the rod 77 and therefore the position which the rod will assume, after compression of the member 72, will not always be the same as it will depend, to some extent, upon the frictional quality of the resilient material of which the member 72 is made. Figures 13 and 14 illustrate one position which the rod 77 may assume and it will be noted that the cap 73 has moved downwardly a considerable distance from the head 78 of the rod 77, with the result that the head 78 is positioned within the socket 66. In view of this possible range of movement, the apparatus is preferably so designed that the diameter of the head 78 will be smaller than the internal diameter of the socket 66. It will also be noted that the fitting 1 should be of sufficient depth to allow for a considerable downward movement of the rod 78.

Upon expansion of the member 72 of the shut-off apparatus, it will be forced into contact with the adjacent walls of the pipe, as shown in Figures 13 and 14, and act as a valve to close off the section of the pipe which is below or downstream with respect to the member 72.

After the desired extensions or repairs are completed, the shut-off apparatus may be removed, without substantial loss of fluid or fluid pressure, in the following manner.

The first step in the method of removing the shut-off apparatus consists in turning the feed screw 63, of the shut-off apparatus 2, to the left to relieve the downward pressure on the shut-off member 72. This will result in a lateral contraction of the shut-off member, owing to the resiliency of the material of which it is made, and the fluid will flow through the spaces thus created between the shut-off member and the adjacent walls of the pipe.

The yoke 64 may then be disengaged from the bar 58, of the shut-off apparatus and the member 72 is drawn up into the chamber 52 by pulling up on the handle 60.

After the shut-off member 72 has been withdrawn, the gate valve 33 is operated to closed position, thus preventing flow of fluid into the shut-off apparatus, whereupon the shut-off apparatus may be detached without substantial loss of fluid or fluid pressure.

Since, in most cases, it will not be convenient or economical to utilize the gate valve as a closure for the open end of the fitting for an indefinite period of time, a closure preferably comprising a plug member 84, having external threads adapted to engage the internal threads 23 of the fitting opening 20, is inserted in the fitting. This may be done without substantial loss of fluid or fluid pressure by detaching the shut-off member 72 from the lower end of the bar 58 and attaching to the latter a tool which is adapted to grip the upper surface of the closure 84. The adapter 51 and the chamber 52, together with the bar 58, carrying closure 84, may then be attached to the upper end of the valve body 31. The valve 33 is then moved to open position and the bar 58 lowered and rotated to thread the closure 84 into the upper open end of the fitting. It will be apparent that after the closure 84 has been threaded into the upper open end of the fitting, the valve body 31 and the apparatus associated therewith may be unscrewed and removed without substantial loss of fluid or fluid pressure.

If desired, a cap 85 may then be screwed on over the open end of the fitting. Means may also be provided for unscrewing the closure 84 from the open end of the fitting, after the valve body 31 and housing 52 have been secured thereto, without substantial loss of fluid or fluid pressure.

In the foregoing description it was pointed out that fittings 1 are preferably of such size that their lateral openings have an appreciably greater internal diameter than the external diameter of the pipe to which the fitting is attached, and that the openings which are established in the pipe and within the fitting have a diameter which is preferably larger than the internal diameter of the pipe, as shown in Figures 5 and 15.

Figure 16:
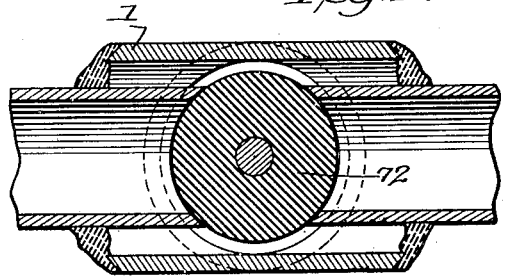
Figure 16 is a view similar to Figure 15, illustrating the use of the same apparatus with a pipe of smaller diameter.

In some instances, as for example, where the pipe which is to be operated upon is of unusually small diameter, the lateral openings of the fitting 1 may have a much greater diameter than the external diameter of the pipe, and the diameter of the shell cutter may be substantially greater than the external diameter of the pipe with the result that the entire cross section of the pipe is removed, as shown in Figure 16. In this case the shut-off or by-passing member expands laterally against the opposed end walls of what may be regarded as two pipes and satisfactory results are obtained.

Figure 17:
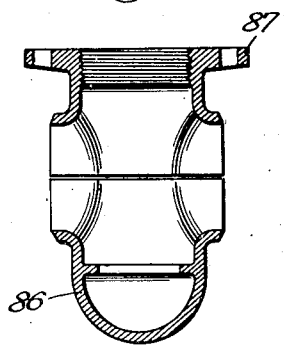
Figure 17 is a longitudinal sectional view, similar to Figure 8, of a modified form of fitting.
Figure 18:
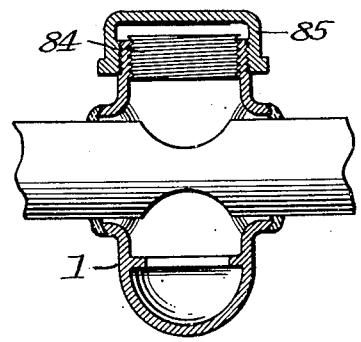
Figure 18 is a sectional view of the preferred form of fitting having a closure inserted in the open end thereof and a cap applied over the closure.

There is shown in Figure 17 a modified form of the fitting, wherein the fitting 86 is provided at its upper end with an external apertured flange 87 in lieu of the external threads 22 of the fitting 1. This type of fitting, which resembles the fitting 1 in all other respects, is adapted to be used with apparatus having correspondingly apertured flanges for attachment thereto by means of bolts and nuts.

Since the above apparatus and methods may be modified without departing from the scope of the invention, it is intended that all matter contained in the above description or shown in the accompanying drawings shall be regarded as merely illustrative.

Matter described, but not claimed herein, is claimed in our copending applications Serial No. 100,782, filed September 14, 1936, and Serial No. 122,248, filed January 25, 1937; and also in the copending applications of Timothy A. Larry, Earl E. Cline, and Orville J. Hawkins, Serial No. 100,780, filed September 14, 1936, and Serial No. 128,284, filed February 27, 1937.

We claim:
1. The method of drilling a pipe and attaching thereto a fitting having a tubular body portion which is open at one end and which is provided with lateral openings and hubs extending outwardly from said lateral openings, comprising cutting the fitting transversely into two parts, the plane of severance bisecting said lateral openings, bringing the two parts together with the pipe passing through said lateral openings, welding the two parts to each other and welding the fitting to the pipe at the peripheries of said hubs and drilling the pipe by a tool inserted through the open end of the tubular body portion.

2. The method of drilling a pipe and attaching thereto a fitting having a tubular body portion which is open at one end and which is provided with lateral openings and hubs extending outwardly from said lateral openings, comprising cutting the fitting transversely into two parts, the plane of severance bisecting said lateral openings, bringing the two parts together with the pipe passing through said lateral openings, welding the two parts to each other along one side, rotating the fitting approximately 180° about the pipe and welding the other side, welding the fitting to the pipe at the peripheries of said hubs and drilling the pipe by a tool inserted through the open end of the tubular portion.

TIMOTHY A. LARRY.
EARL E. CLINE.